(12) United States Patent
Kesterson (10) Patent No.: US 7,505,287 B1
(45) Date of Patent: Mar. 17, 2009

(54) ON-TIME CONTROL FOR CONSTANT CURRENT MODE IN A FLYBACK POWER SUPPLY

(75) Inventor: John William Kesterson, San Jose, CA (US)

(73) Assignee: iWatt Inc., Los Gatos, CA (US)

( * ) Notice: Subject to any disclaimer, the term of this patent is extended or adjusted under 35 U.S.C. 154(b) by 267 days.

(21) Appl. No.: 11/558,326

(22) Filed: Nov. 9, 2006

Related U.S. Application Data (60) Provisional application No. 60/735,522, filed on Nov. 10, 2005, provisional application No. 60/845,658, filed on Sep. 18, 2006.

(51) Int. Cl.
   *H02M 3/335* (2006.01)
(52) U.S. Cl. .............. 363/21.01; 363/21.08; 363/21.16
(58) Field of Classification Search .............. 363/21.01, 363/21.02, 21.08, 21.09, 21.12, 21.16, 21.17, 363/23, 25; 323/283, 284
   See application file for complete search history.

(56) References Cited

U.S. PATENT DOCUMENTS

| 6,166,927 | A | * | 12/2000 | Farrington et al. ............ 363/25 |
| 6,760,203 | B2 | * | 7/2004 | Usui .......................... 361/18 |
| 7,362,593 | B2 | * | 4/2008 | Yang et al. ............... 363/21.16 |
| 7,443,700 | B2 | * | 10/2008 | Yan et al. ................. 363/21.01 |
| 2008/0067994 | A1 | * | 3/2008 | Kesterson et al. ........... 323/283 |

* cited by examiner

Primary Examiner—Jessica Han
(74) Attorney, Agent, or Firm—Fenwick & West LLP (57) ABSTRACT

The present invention is a system and a method that controls the current limit such that it is maintained within a small range for any acceptable input voltages, e.g., 90 to 264 Volts RMS, causes the output voltage of a PWM controller to drop as the output load increases so as to maintain a constant current output, and does cycle by cycle calculation compensating for the $V_{IN}$ ripple output from the bridge and bulk filter capacitor so that no loop filter is required in the constant current mode.

21 Claims, 7 Drawing Sheets

ON-TIME CONTROL FOR CONSTANT CURRENT MODE IN A FLYBACK POWER SUPPLY

RELATED APPLICATIONS

This application claims priority from U.S. provisional application No. 60/735,522 filed on Nov. 10, 2005 and U.S. Provisional application No. 60/845,658 filed on Sep. 18, 2006 which are both incorporated by reference herein in their entirety.

FIELD OF THE INVENTION

The present invention is related to a power supply and more particularly to pulse width modulation (PWM) and pulse frequency modulation (PFM) controllers for limiting current with primary-side sensing and feedback.

BACKGROUND OF THE INVENTION

Pulse width modulation (PWM) is a conventional technology used for controlling power converters to achieve output power, voltage, and current regulation. Conventional flyback power converters include a power stage for delivering electrical power from a power source to a load, a switch in the power stage that electrically couples or decouples the load to the power source, and a switch controller coupled to the switch for controlling the on-time and off time for the switch. The on-time ($T_{ON}$) and off-time ($T_{OFF}$) for the switch can be modified by the controller based on a feedback signal representing output power, voltage, or current. The energy is stored in the transformer core gap when the switch is on, and is transferred to the load circuit when the switch is off. Regulation can be accomplished by, among other things, measuring the output power, voltage, or current, and feeding an indicating signal back to the primary side controller, which can modify the $T_{ON}$-time and $T_{OFF}$-time of the switch accordingly to effectively regulate the output power, voltage, or current. The switching cycle $T_S$ is the sum of the on-time $T_{ON}$ and off-time $T_{OFF}$.

In power supply designs, it is necessary to regulate power, voltage, or current depending upon the application. The present invention is related to the regulation of current in a mode called "Constant Current", or (CC) mode.

Figure 1:
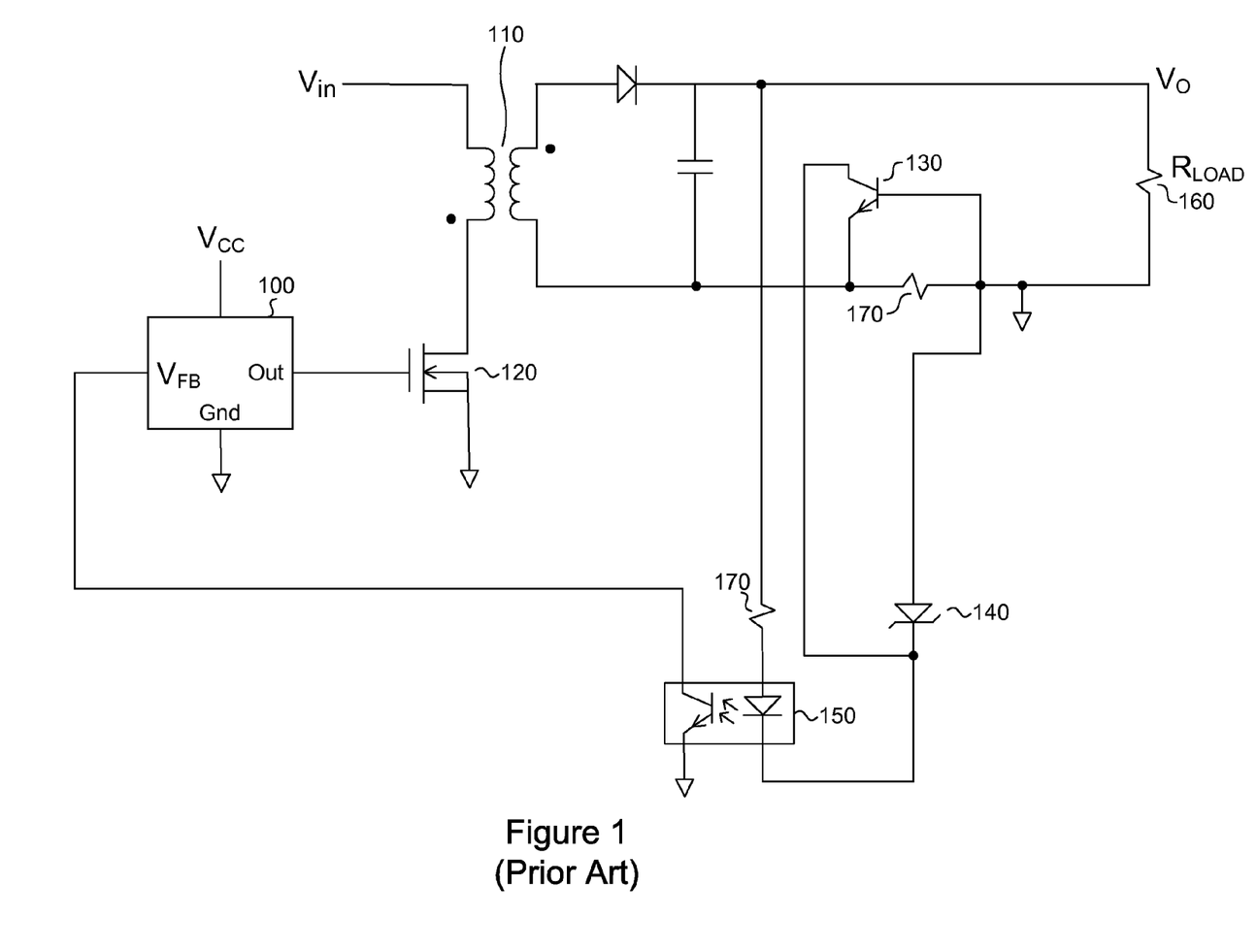
FIG. 1 is an illustration of a conventional secondary side current sensing circuit.

One conventional power supply system involves a flyback converter that senses the output voltage directly from the secondary side of the transformer. This is called secondary sensing. FIG. 1 is an illustration of such a conventional secondary side sensing circuit.

FIG. 1 illustrates a traditional flyback power supply with secondary sensing. It is configured to regulate both voltage in constant voltage (CV) mode and current in constant current (CC) mode. The PWM controller 100 is powered by Vcc which can be derived a number of different ways from the power supply. When the PWM controller begins operation, it outputs a PWM stream to MOSFET 120, which turns on the primary current of transformer 110. As the flyback operation takes place, energy is transferred from the primary side to the secondary side of the transformer during each cycle that over time constitutes an output power to be dissipated over the Load 160. As the output voltage exceeds the sum of the zener diode 140 voltage and the drop across the forward biased diode, which is part of the opto-coupler 150, the opto-coupler diode conducts, and turns on the NPN photo-transistor that is part of the same opto-coupler 150 integrated circuit. When the transistor is turned on, this draws current that causes the controller to reduce the $T_{ON}$-time. In addition, there is a current sense resistor 170 that will develop a voltage drop across the base-emitter junction of transistor 130. When the load resistance 160 is decreased such that the power supply delivers the maximum current, the transistor 130 bypasses the zener diode 140, and causes current regulation.

There are at least two significant drawbacks in cost to this solution. First, it requires the external circuit consisting of the transistor 130 and the current sense resistor 170 to aid the current regulation. The second drawback is the wasted power dissipated by the sense resistor, which reduces the overall system efficiency.

Figure 2:
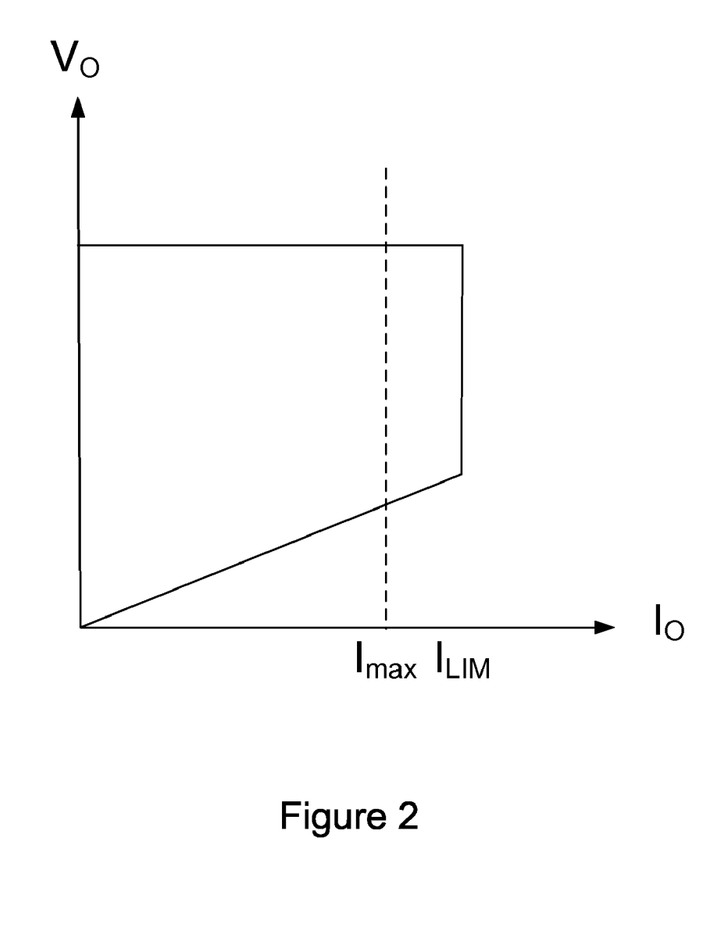
FIG. 2 is an illustration of an ideal constant current behavior in the VI curve.

FIG. 2 is an illustration of the ideal VI curve demonstrating the desired performance where the power supply controller transitions from a Constant Voltage (CV) mode to a Constant Current (CC) mode. The shape of this curve is ideally unchanged as a function of what the $V_{IN}$ value is. In fact, this $V_{IN}$ comes from an alternating current (AC) source through a rectifier bridge and a minimal bulk capacitance.

Figure 3:
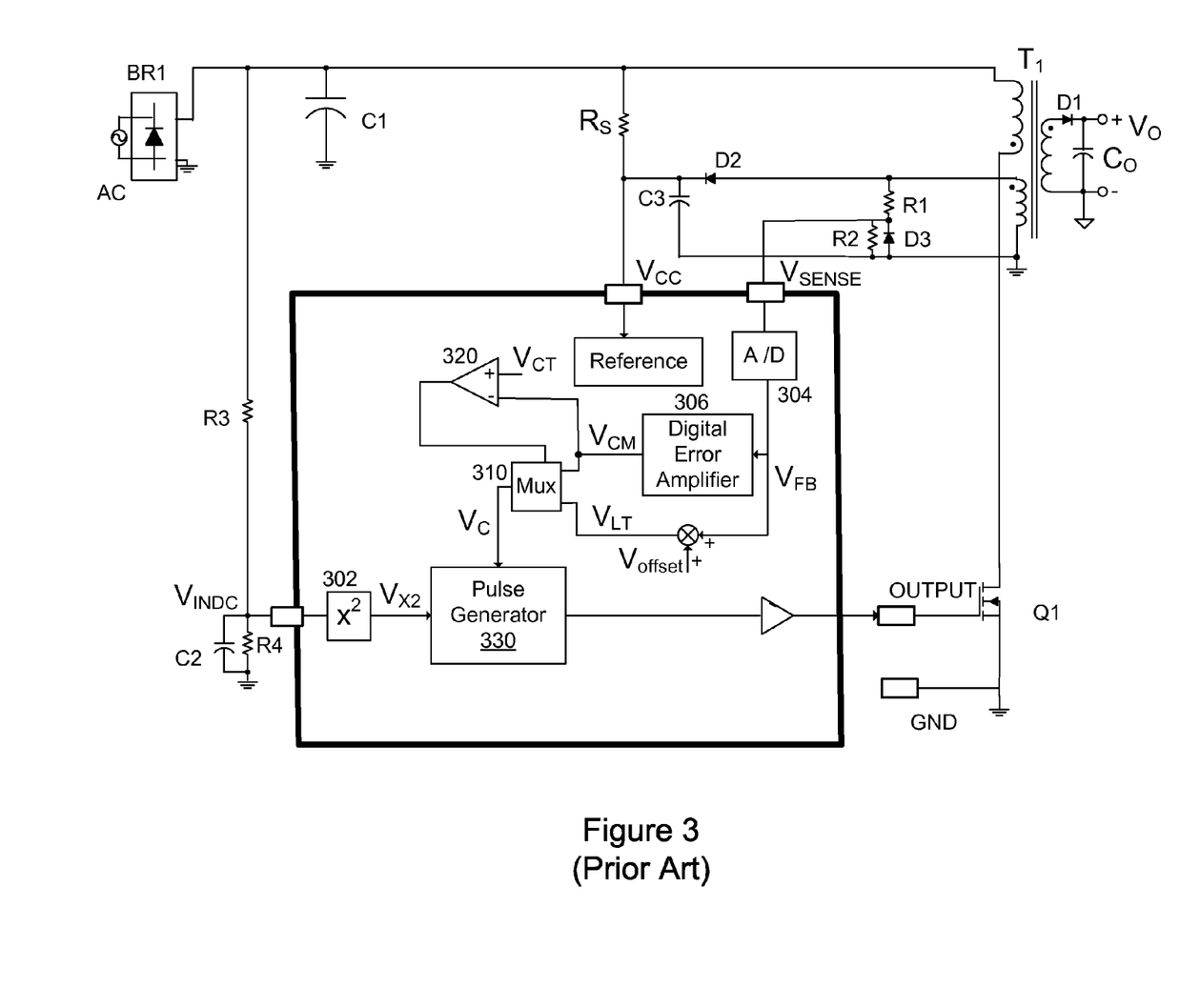
FIG. 3 is an illustration of a conventional primary side current sensing circuit.

FIG. 3 is an illustration of a conventional system. It is a primary side feedback method where the current regulation takes advantage of knowledge of the input AC voltage and the output voltage. It is the subject of U.S. Pat. No. 6,972,969 that is incorporated by reference herein in its entirety (the Shteynberg patent).

With reference to FIG. 3, a rectifier, e.g., bridge diode (BR1), receives an AC signal that typically has a voltage that ranges from 90V to 264V and outputs a rectified signal. Capacitor C1 acts as a high frequency filter for the output of the BR1 that is coupled to a primary side winding of a transformer T1. Transformer T1 includes a primary and auxiliary winding on the primary side and a secondary winding on the secondary (output) side. In this embodiment, conventional circuitry, e.g., rectifying diodes D2, D3 and filter C3, R1, R can be used to sense the voltage ($V_{SENSE}$) on the auxiliary winding (primary side). The direct current (DC) input voltage ($V_{INDC}$) is identified by using, for example, sense resistor R3 in combination with a low frequency filter (C2/R4). The secondary winding is coupled to an output rectifier diode D1 and output filter C0.

In a flyback type power converter that operates in discontinuous conduction mode, the output power $P_o$ can be expressed as:

$$P_o = \frac{Vin^2}{2L_M} \times \frac{t_{on}^2}{T_S} \times \eta \qquad (1)$$

$$I_o = \frac{P_o}{V_o} = \frac{Vin^2}{2L_M} \frac{k}{V_o} \eta \qquad (2)$$

Where $\eta$ is the power efficiency (Po/Pin), and $$k = \frac{t_{on}^2}{T_S} \qquad (3)$$

For a given line voltage, the output power is directly proportional to k, which is the ratio of the square of the $T_{ON}$-time to the switching period $T_S$. This means that k is substantially a constant for a particular output voltage. Hence, the output current can be limited based upon the value of the output voltage. The current can be controlled at a constant level based upon the sensed output voltage. The on-time $T_{ON}$ and switching period $T_S$ are generated by the pulse generator 330. A conventional analog-to-digital (A/D) converter 304 generates the digital feedback voltage signal $V_{FB}$ from the $V_{SENSE}$ signal. The feedback voltage signal is directly proportional to the output voltage under any condition cycle by cycle.

The $V_{FB}$ is sent to the input of a conventional digital error amplifier 306, which generates an error feedback signal $V_{CM}$. In one embodiment of the present invention, the $V_{CM}$ signal is the proportional-integral (PI) function of the normal (nominal) feedback voltage level $V_{FB\_NOM}$ and the feedback voltage which represents the output voltage.

When the output current is increased, the feedback voltage $V_{FB}$ is decreased corresponding to the drop of output voltage. This results in an increase in $V_{CM}$. The error voltage signal $V_{CM}$ is received by the pulse generator 530 as the control signal $V_C$ and is used by the pulse generator 530 to control the on-time ($T_{ON}$) and the switch period $T_S$, to achieve a constant k. Thereafter, the on-time can be increased to deliver more power to output until the output voltage is within the tolerance level. The deviation of the on-time $\Delta t_{on}$ is inversely proportional to the deviation of feedback voltage $\Delta V_{FB}$. Accordingly, when the output current is less than the current limit (as represented by $V_{CM}$) this loop is a negative feedback loop.

The multiplexor is controlled by the current limit block 320 that sets the control voltage signal $V_C$ equal to the error voltage signal $V_{CM}$ when the value of the error voltage signal corresponds to the output current being less than the preset voltage signal $V_{CT}$ that corresponds to the limited output current $I_{LIM}$. Otherwise, when the output current limit exceeds its limit, $I_{LIM}$, the control voltage signal $V_C$ is set to the current limit voltage signal $V_{LT}$.

In general, the current limit voltage $V_{LT}$ is equal to the feedback voltage increased by an offset. The loop created when the output current limit is reached is a positive feedback loop. At the moment the output current reaches the limited current $I_{LIM}$, the control voltage Vc is set equal to $V_{LT}$. When the output current is increased by $\Delta I_{LMT}$, the feedback voltage decreases by $\Delta V_{FB}$. When the control voltage $V_C$ decreases the on-time is reduced. So the power requested by the increased output current is reduced which results in having the output voltage drop linearly. Therefore, the system achieves a substantially constant output current limit with varying output voltage.

As seen in Equation (4), for the given limited output power, the k which represents the on-time and the switching period is inversely proportional to the square of the RMS value of line voltage $V_{IN}$. The Line Square feed-forward block 302 of the present invention receives the DC input voltage $V_{INDC}$ and squares this signal to generate the squared feed-forward signal $V_{in}^2$ in order to permit the pulse generator 330 to account for this factor in determining the on-time $T_{ON}$ and the switch period $T_S$. The pulse generator receives the squared feed-forward signal $V_{X2}$ and the control signal $V_C$ and modifies the on-time and the switch period of the switch Q1. So it results that the energy to be delivered to the output is identified at low line and high line voltage. Consequently the limited maximum output current $I_{LIM}$ is identified.

That is, the current can then be controlled at a constant level based upon the sensed output voltage, and the square of the input voltage ($V_{IN}$).

$$t_{on}^2 = \frac{I_o 2 L_M T_S V_o}{V_{in}^2} \quad (4)$$

From this relationship, a feed-forward $V_{in}^2$ signal is used in the PWM pulse generation circuit, together with a measured $V_{SENSE}$ voltage that is a scaled representation of the output voltage, derived from the primary side auxiliary winding of the transformer. The operation of this circuit is explained in further detail within the Shteynberg patent. The feed-forward squared $V_{IN}$ can be accomplished by any number of methods, both analog or digital by those skilled in the art of design.

This method measures the output voltage by the use of an analog-to-digital circuit (ADC) 304 connected to the $V_{SENSE}$ line of the controller. The current accuracy is influenced by the external components and the turns ratio between the secondary winding and the auxiliary winding on the primary side. The multiplication of the $V_{IN}$ signal by itself is yet another complexity to the implementation. The referenced patent states that the k value which represents the on-time and the switching period is inversely proportional to the square of the RMS value of the line voltage $V_{IN}$.

What is needed is a primary side sensing current control system and a method that (1) controls the current limit such that it is maintained within a small range of any acceptable input voltage, e.g., 90 to 264 Volts RMS, and (2) causes the output voltage of the PWM controller to drop as the output load increases when the full current is reached, and (3) uses the instantaneous value of the $V_{IN}$ to influence a cycle by cycle calculation of the on-time and off-time, thus allowing removal of the line frequency components from the output by compensating for them on a cycle by cycle basis in the time calculations.

SUMMARY OF THE INVENTION

The present invention is a primary side sensing power control system and method for constant current control. Conventional systems use of the relationship between the square of the input line voltage, and the output voltage to determine the on-time and off-time for current regulation. The present invention utilizes a relationship that involves the input voltage, $V_{IN}$ (not squared), and the measured reset-time from the previous cycle to determine the on-time and off-time for the next cycle. Furthermore, it uses an instantaneous update of the $V_{IN}$ DC value at each switching cycle of the power supply. This removes the line frequency ripple from the output by compensating for them in real time in the on-time and off-time calculations. It also uses a time measurement instead of a voltage measurement for the current calculation which in many cases is easier to perform.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

A preferred embodiment of the present invention is now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory and/or within a logic element. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or "dividing" or the like, refer to the action and processes of a logic device, collection of logic devices, computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

As described above, the present invention is a system and a method that (1) controls the current limit such that it is maintained within a small range for any acceptable input voltages, e.g., 90 to 264 Volts RMS, (2) causes the output voltage of a PWM controller to drop as the output load increases so as to maintain a constant current output, and (3) does cycle by cycle calculation compensating for the $V_{IN}$ ripple output from the bridge and bulk filter capacitor so that no loop filter is required in the constant current (CC) mode. The present invention accomplishes this using primary side sensing of the reset time for each cycle of the transformer, and using this time measured result to calculate the value of on-time for the operation of the next cycle. The switch period remains fixed, and a single value of on-time is calculated for each cycle. A slight variation on this technique can in fact be used if a variable switch period is utilized, using the same method. An instantaneous variation in the input line voltage is compensated for in the on-time calculation on each cycle using a direct sampling of the $V_{IN}$ value, without squaring it, resulting in a stable and substantially constant current limit.

In a flyback power converter that operates in discontinuous conduction mode, the peak primary current is:

$$I_{PP} = \frac{V_{in}}{L_M} T_{on} \qquad (5)$$

This is based on the familiar relationship between voltage and current in an inductor:

$$\frac{d}{dt} IL = V \qquad (6)$$

The output secondary peak current is:

$$I_{PS} = I_{PP} N \qquad (7)$$

The value N is the turns ratio of the transformer. The average output current is:

$$I_{AS} = \frac{I_{PS}}{2} \frac{T_R}{T_S} \qquad (8)$$

The value $T_R$ is the reset time for the secondary of the transformer. That is, the reset time is the duration of the current pulse on the secondary side, e.g., the time for the magnetic field of the secondary winding to collapse As described below, one measurement of this is the time duration between the trailing transition of the PWM_OUT signal from a high to a low state, and the falling edge of the transformer auxiliary voltage, as represented by $V_{SENSE}$. $T_S$ is the timer for the whole switching cycle, that is, the sum of the on-time and the off-time.

Therefore, by substitution, the output average current is defined as:

$$I_{AS} = \frac{V_{in}}{2L} T_{ON} N \frac{T_R}{T_S} \qquad (9)$$

$$I_{AS} = \frac{V_{in}T_{on}NT_R}{2L_M T_S} \quad (10)$$

From equation 10, the output current is proportional to the product of the on-time $T_{ON}$ and the reset-time $T_R$. This is the principal on which the present invention operates. Equation (11) illustrates the solving equation (10) for $T_{ON}$.

$$T_{ON} = \frac{2I_{AS}L_M T_S}{V_{IN}NT_R} \quad (11)$$

In the above equation, $I_{AS}$, $L_M$, $T_S$, and N are all known parameters in the application. Since they are all known values, equation (11) can be rewritten as such.

$$T_{ON}(n) = \frac{\text{NUM\_TON\_CC}}{V_{IN}T_R(n-1)} \quad (12)$$

In equation (12), the value NUM_TON_CC is defined:

$$\text{NUM\_TON\_CC} = \frac{2I_{AS}L_M T_S}{N} \quad (13)$$

The value for NUM_TON_CC is normalized for the units of time being worked with in the measurement of $T_R$, the unit of time in the $T_{ON}$ result, and the unit of measure for the $V_{IN}$ (volts/lsb), where lsb is the least significant bit of the ADC used to quantify it. Once this has been done, equation (12) can be implemented in digital hardware by a succession of two division operations using, for example, the same divider hardware over both operations. In the first operation, NUM_TON_CC is divided by $V_{IN}$, and in the second operation, the intermediate result is further divided by $T_R$. The digital result will be the integer number of clock cycles to use for the next cycle of switching. Note that in equation (12), the use of the variable n indicates that the new value of the on-time is based on the (n−1) value of the measured reset-time. Note also that equation 10 can be solved for $T_S$ instead of $T_{ON}$, to arrive at a method for constant current control in PFM mode based on the same concept. In this mode, a new period $T_S$ is calculated each cycle based on the previous reset measurement. This accomplishes the same constant current control in a PFM environment.

Figure 4:
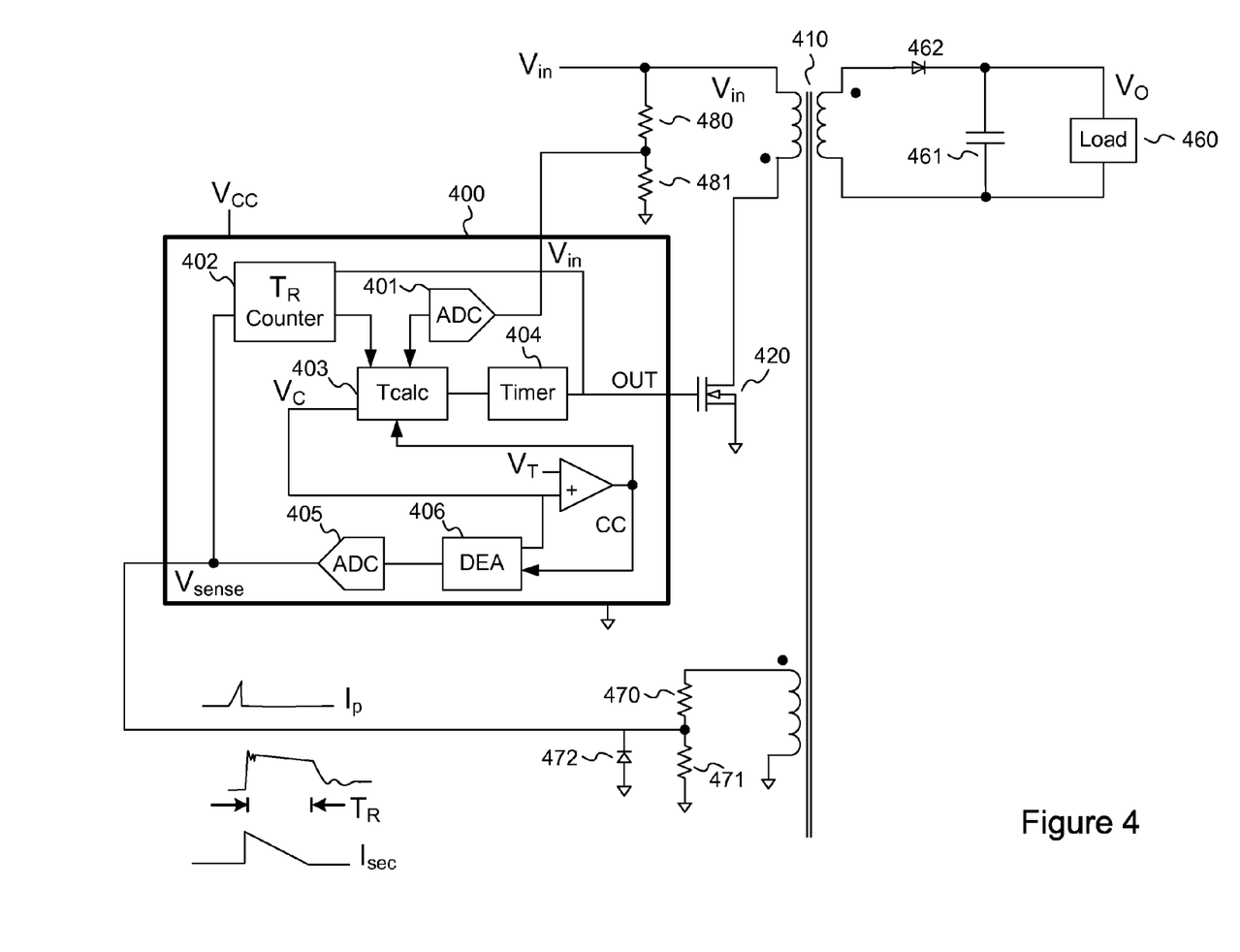
FIG. 4 is an illustration of a primary side sensing power converter circuit according to one embodiment of the present invention.

FIG. 4 is an illustration of one embodiment of the present invention. A full wave rectifier receives an AC signal that is typically filtered with an input bulk capacitance that causes the $V_{IN}$ signal to appear as a large DC voltage with a ripple at twice the line frequency. The input range typically ranges from 90 to 264 Volts RMS. The signal $V_{IN}$ can therefore be as much as 375 volts DC with ripple of anywhere up to approximately 50 volts peak to peak. This DC signal is coupled to the primary winding of the transformer 410. Transformer 410 incorporates a primary and auxiliary winding on the primary side and a secondary winding on the secondary (output) side. Resistors 470, 471, and diode 472 can be used to sense the voltage ($V_{SENSE}$) on the auxiliary winding of transformer 410. This voltage measurement is used in the normal Constant Voltage (CV) mode of operation. In this mode, the $V_{SENSE}$ signal is digitized by ADC 405, compared with a reference, and passed through a Digital Error Amplifier (DEA) 406 to create a control voltage ($V_C$). This control voltage is used to drive a time calculation circuit which derives an on time ($T_{ON}$) based on $V_C$ and the input voltage ($V_{IN}$) by the controller 400. The output of the TCALC device 403 informs a digital timing circuit 404 of the precise on-time and off-time required by the next cycle. The timer 404 generates the PWM pattern specified by the TCALC device 403 which drives the switching FET 420 for the period $T_{ON}$ during the switching period $T_S$.

When the Control Voltage ($V_C$) exceeds a threshold, a signal is fed to the TCALC device 403 to let it know it will do Constant Current (CC) mode operations instead of CV operations. This signal also tells the DEA 406 to clamp its operations so that the $V_C$ will not substantially exceed the voltage threshold. In this mode, the TCALC device 403 performs the two divisions described above, instead of using $V_C$, to derive on-time and off-time. This efficiently uses the division circuitry in the TCALC device 403. In alternate embodiments separate logic may perform the division operations. Now it uses the reset time from the previous cycle which was measured by $T_R$ counter 402. The $T_R$ counter can be a shared counter that is used for other purposes as well, e.g., it can be used for Timer 404. In the CC mode of operation, TCALC knows the value of NUM_TON_CC, and it receives $V_{IN}$ from ADC 401, and receives $T_R$ from counter 402. Therefore, it is able to calculate the on-time on a cycle by cycle basis. If the load changes, the reset time changes accordingly; and the on-time will then be adjusted on the next cycle to compensate for any load change. Therefore a constant current regulation will be sustained with a varying output voltage.

Figure 5:
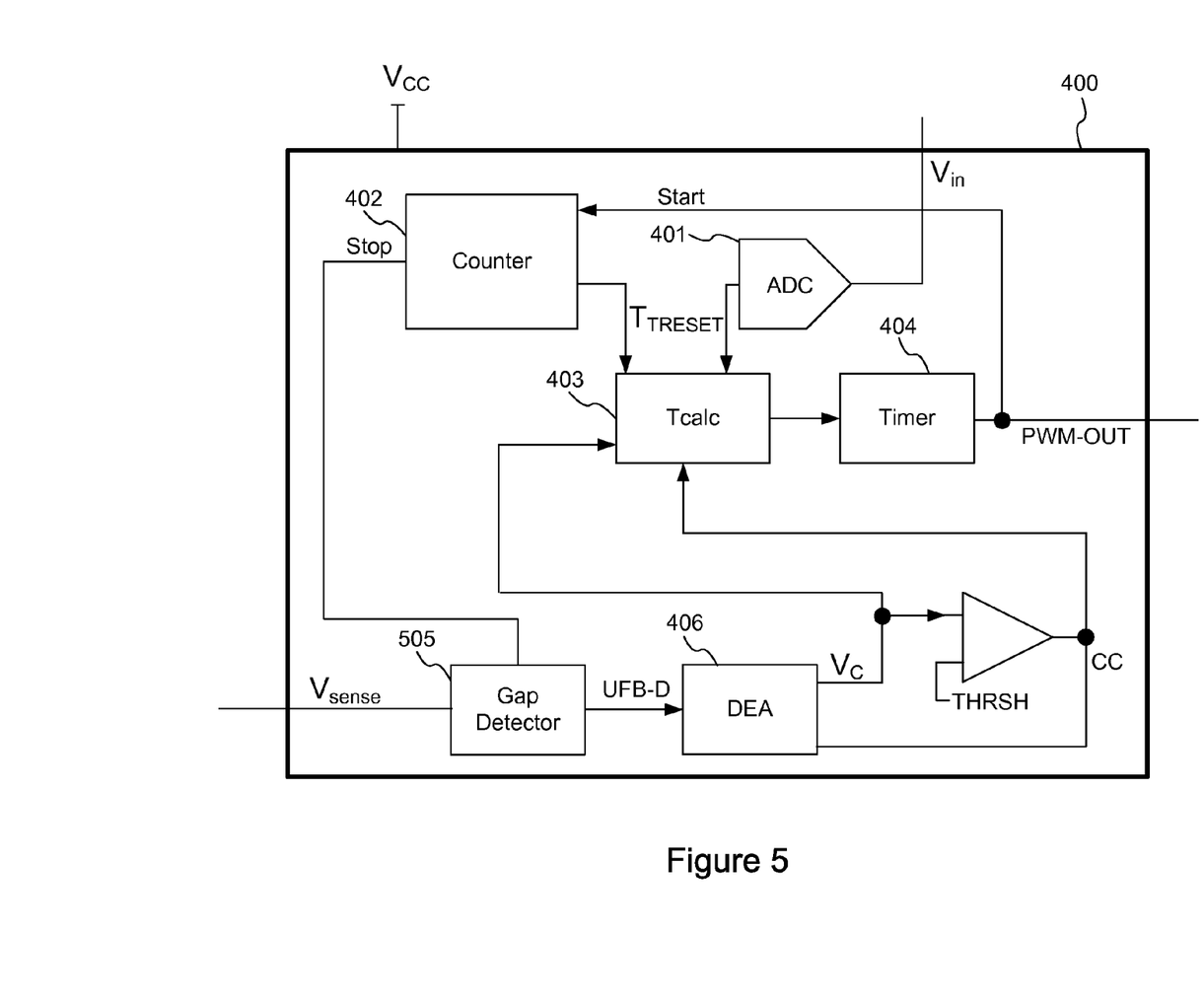
FIG. 5 is another embodiment of the controller 400 of the present invention.

FIG. 5 is another embodiment of the controller 400 of the present invention. In one embodiment of the present invention the counter 402 is enabled to reset and begin a new count at the falling edge of signal PWM_OUT. The counter is stopped when the GAP detector 505 identifies the knee in the $V_{SENSE}$ signal. One example of a GAP detector 505 is described in U.S. Pat. No. 6,956,750 which is incorporated by reference herein in its entirety. The counter 402 can also be stopped by using a comparator to measure the falling edge of the $V_{SENSE}$ signal. The counter thus represents the digital measurement of the reset time ($T_R$ or $T_{RESET}$). Some time after this counter has stopped a pulse is generated called "TCALC". This will cause the TCALC device 403 to perform two divisions. First, it will take the NUM_TON_CC and divide it by the current value of $V_{IN}(n-1)$. Then it will take that intermediate result, and divide it further by the counter value (Tr(n−1)). The result will be the on-time ($T_{ON}(n)$) for the next cycle. This result is passed to the Timer 404 and used for the generation of the next cycle of the PWM_OUT signal. In another embodiment, the counter 402 can be part of the timer 404.

Figure 6:
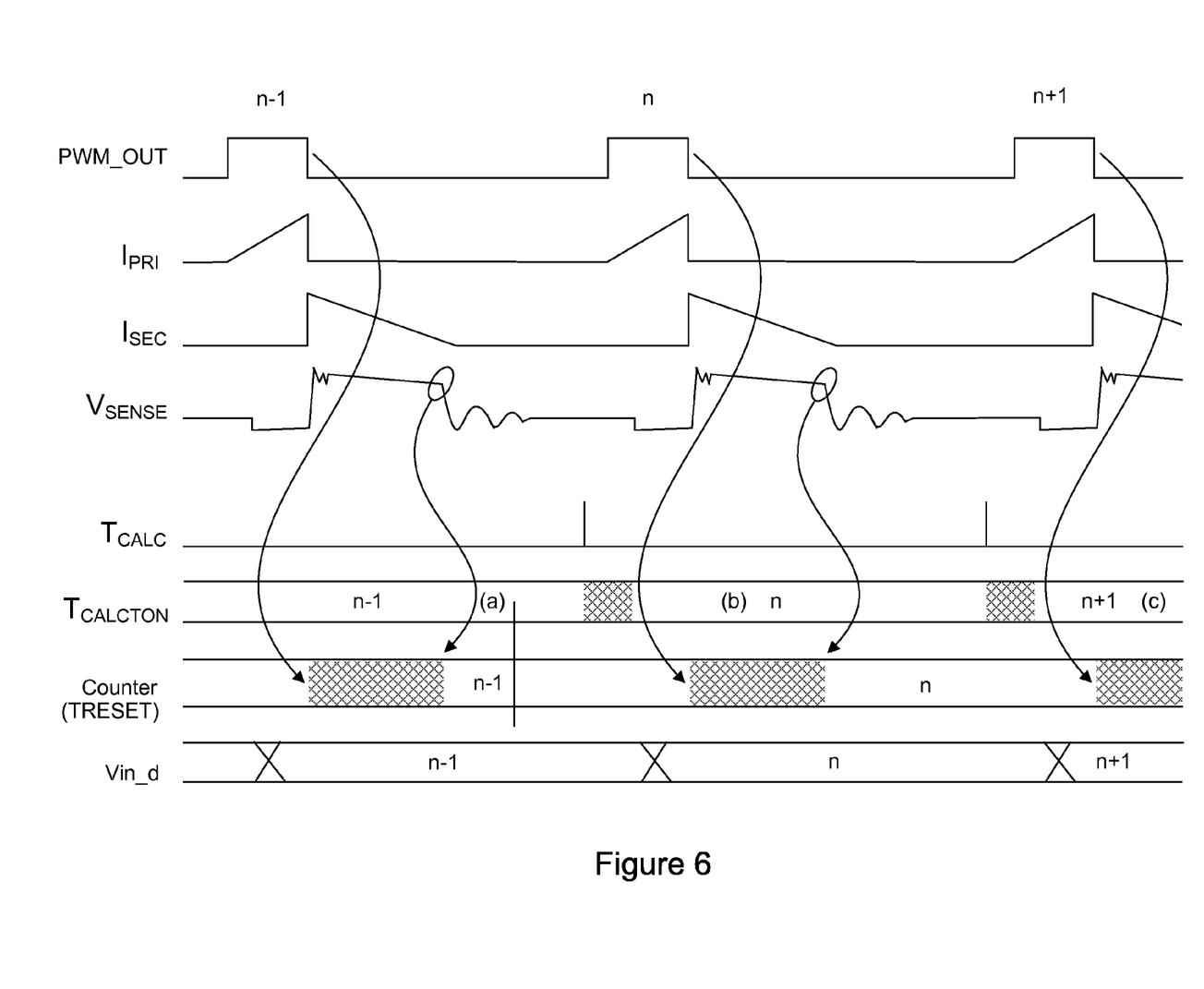
FIG. 6 is a timing diagram of the circuits illustrated in FIG. 4 and FIG. 5 in accordance with embodiments of the present invention.

FIG. 6 is a timing diagram of the circuits illustrated in FIG. 4 and FIG. 5 in accordance with embodiments of the present invention. In one preferred embodiment of the present invention, counter 402 is enabled to reset and begin a new count at the falling edge of signal PWM_OUT. The counter is stopped when the GAP detector 505 determines it has found the knee in the $V_{SENSE}$ signal. The counter 402 thus represents the digital measurement of the reset time (TR). Some time after this counter 402 has stopped a pulse is generated called "Tcalc". This will cause the TCALC device 403 to perform two divisions. First, it will take the NUM_TON_CC and divide it by the current value of $V_{IN}(n-1)$. Then it will take that intermediate result, and divide it further by the counter value (Tr(n−1)). The result will be the on-time ($T_{ON}(n)$) for the next cycle. This result is immediately passed to the Timer 404 and used for the generation of the next cycle of the PWM_OUT signal. FIG. 6 also shows the primary side current ($I_{PRI}$) and the secondary side current ($I_{SEC}$).

Figure 7:
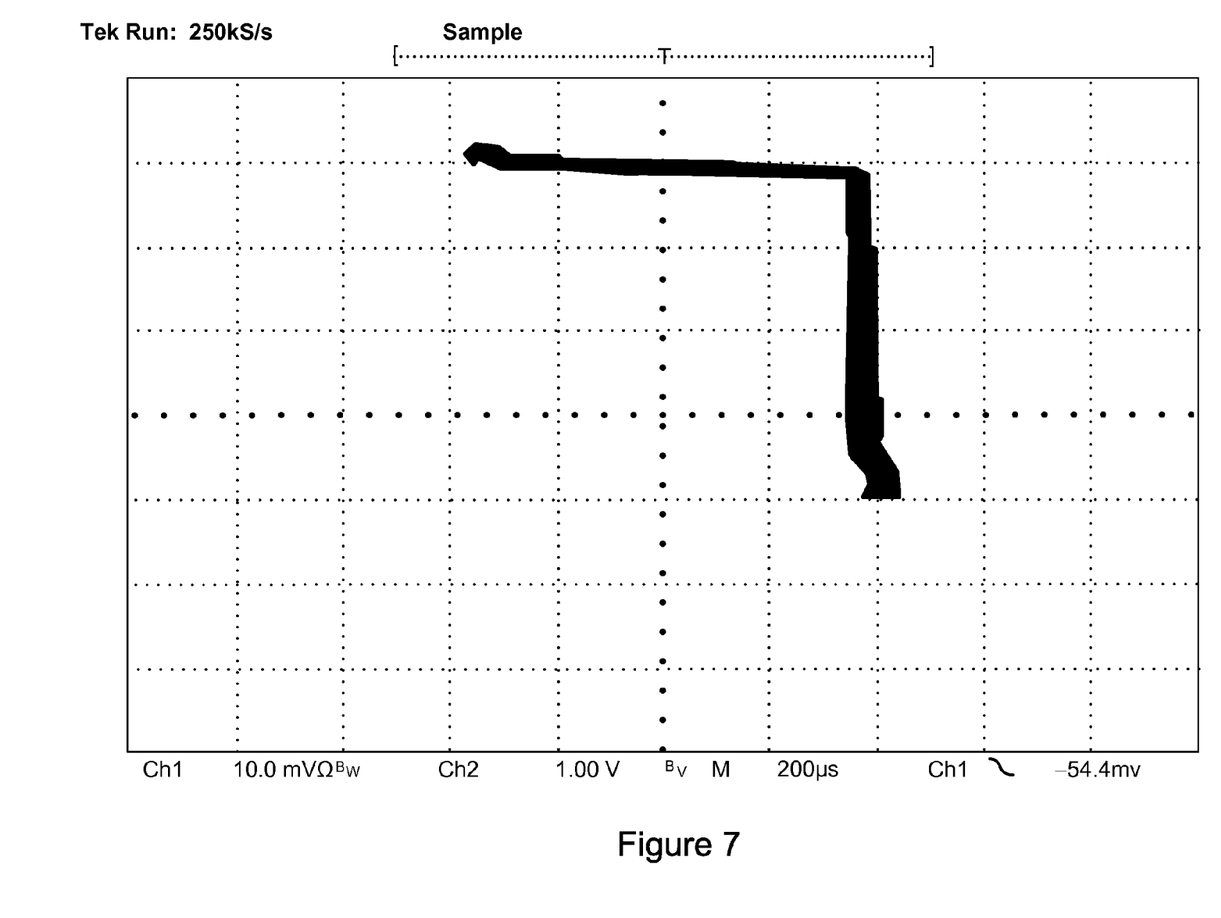
FIG. 7 is a graph showing experimental results for one embodiment of the present invention.

FIG. 7 is a graph showing experimental results for one embodiment of the present invention. The value of the output current Io varies by a small percentage over the range of input voltages of 90-264 Volts RMS, and a load change from 1 to 5 ohms.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for limiting an output current of a power supply over multiple switching cycles in a constant current mode using pulse width modulation, said power supply having a primary and secondary side, the method comprising the steps of:
   generating a sense voltage signal on the primary side that is proportional to an output voltage signal on the secondary side;
   measuring a reset time on the primary side using said sense voltage signal, said reset time representing a duration of a current pulse on the secondary side; and
   generating a digital feedback voltage signal used to maintain a substantially constant current on the secondary side, said digital feedback voltage signal representing the on-time for a subsequent switching cycle, wherein a product of said on-time for a subsequent switching cycle and said reset-time for a present switching cycle is a first value, wherein said first value is substantially constant for multiple switching cycles.

2. The method of claim 1, wherein said step of generating a digital feedback voltage signal comprises two division operations.

3. The method of claim 2, wherein said step of generating a digital feedback voltage signal comprises the steps of:
   dividing a first constant value by an input voltage value to generate a first intermediate value;
   diving said first intermediate value by a value proportional to said reset-time for said present switching cycle to generate the digital feedback voltage signal.

4. The method of claim 3, wherein said input voltage value is a digital representation of an instantaneous level of an input voltage of the power supply.

5. The method of claim 4, wherein said input voltage value compensates for fluctuations in said input voltage based upon line frequency components.

6. The method of claim 1, where said step of generating a digital feedback voltage signal uses an input voltage value that is a digital representation of an instantaneous level of an input voltage of the power supply.

7. The method of claim 6, wherein said input voltage value compensates for fluctuations in said input voltage based upon line frequency components.

8. A power supply control system for limiting an output current of the power supply over multiple switching cycles in a constant current mode using pulse width modulation, said power supply having a primary and secondary side, comprising:
   sense voltage means for generating a sense voltage signal on the primary side that is proportional to an output voltage signal on the secondary side;
   reset time means for measuring a reset time on the primary side using said sense voltage signal, said reset time representing a duration of a current plus on the secondary side; and
   feedback means for generating a digital feedback voltage signal used to maintain a substantially constant current on the secondary side, said digital feedback voltage signal representing the on-time for a subsequent switching cycle, wherein a product of said on-time for a subsequent switching cycle and said reset-time for a present switching cycle is a first value, wherein said first value is substantially constant for multiple switching cycles.

9. The system of claim 8, wherein said feedback means includes a division means for performing two division operations.

10. The system of claim 9, wherein said division means divides a first constant value by an input voltage value to generate a first intermediate value, and divides said first intermediate value by a value proportional to said reset-time for said present switching cycle to generate the digital feedback voltage signal.

11. The system of claim 10, wherein said input voltage value is a digital representation of an instantaneous level of an input voltage of the power supply.

12. The system of claim 11, wherein said input voltage value compensates for fluctuations in said input voltage based upon line frequency components.

13. The system of claim 8, where said feedback means utilizes an input voltage value that is a digital representation of an instantaneous level of an input voltage of the power supply.

14. The system of claim 13, wherein said input voltage value compensates for fluctuations in said input voltage based upon line frequency components.

15. A power supply control system for limiting an output current of the power supply over multiple switching cycles in a constant current mode using pulse width modulation, said power supply having a primary and secondary side, comprising:
   a sense voltage device having including a winding on the primary side, to generate a sense voltage on the primary side that is proportional to an output voltage signal on the secondary side;
   a counter, to determine a reset time on the primary side using said sense voltage signal, said reset time representing a duration of a current pulse on the secondary side; and
   a feedback device, disposed to receive said reset time, to generate a digital feedback voltage signal used to maintain a substantially constant current on the secondary side, said digital feedback voltage signal representing the on-time for a subsequent switching cycle, wherein a product of said on-time for a subsequent switching cycle and said reset-time for a present switching cycle is a first value, wherein said first value is substantially constant for multiple switching cycles.

16. The system of claim 15, wherein said feedback device includes divisional logic for performing division operations.

17. The system of claim 16, wherein said division logic divides a first constant value by an input voltage value to generate a first intermediate value, and divides said first intermediate value by a value proportional to said reset-time for said present switching cycle to generate the digital feedback voltage signal.

18. The system of claim 17, wherein said input voltage value is a digital representation of an instantaneous level of an input voltage of the power supply.

19. The system of claim 18, wherein said input voltage value compensates for fluctuations in said input voltage based upon line frequency components.

20. The system of claim 15, where said feedback device utilizes an input voltage value that is a digital representation of an instantaneous level of an input voltage of the power supply.

21. The system of claim 20, wherein said input voltage value compensates for fluctuations in said input voltage based upon line frequency components.

* * * * *

UNITED STATES PATENT AND TRADEMARK OFFICE
CERTIFICATE OF CORRECTION

| | | |
|---|---|---|
| PATENT NO. | : 7,505,287 B1 | Page 1 of 1 |
| APPLICATION NO. | : 11/558326 | |
| DATED | : March 17, 2009 | |
| INVENTOR(S) | : John William Kesterson | |

It is certified that error appears in the above-identified patent and that said Letters Patent is hereby corrected as shown below:

Column 9, Claim 3, line 44 replace "diving" with --dividing--.

Signed and Sealed this

Eleventh Day of August, 2009

David J. Kappos
*Director of the United States Patent and Trademark Office*